(12) United States Patent (10) Patent No.: US 12,294,494 B2
Schreiber et al. (45) Date of Patent: May 6, 2025

(54) CONFIGURATION SYSTEM FOR A DATA NETWORK, DATA NETWORK, AND CONFIGURATION METHOD

(71) Applicant: Rohde & Schwarz GmbH & Co. KG, Munich (DE)

(72) Inventors: Joachim Schreiber, Munich (DE); Kevin Schwarz, Munich (DE); Mario Lausberg, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 19 days.

(21) Appl. No.: 18/338,588

(22) Filed: Jun. 21, 2023

(65) Prior Publication Data

US 2024/0348503 A1 Oct. 17, 2024

(30) Foreign Application Priority Data

Apr. 13, 2023 (DE) ...................... 20 2023 101 868.8

(51) Int. Cl.
*H04L 41/0866* (2022.01)
*H04L 41/0873* (2022.01)
*H04L 43/04* (2022.01)
*H04L 43/045* (2022.01)

(52) U.S. Cl.
CPC ...... *H04L 41/0866* (2013.01); *H04L 41/0873* (2013.01); *H04L 43/04* (2013.01); *H04L 43/045* (2013.01)

(58) Field of Classification Search
CPC . H04L 41/0866; H04L 41/0873; H04L 43/04; H04L 43/045
See application file for complete search history.

(56) References Cited

U.S. PATENT DOCUMENTS

| | | | |
|---|---|---|---|
| 10,505,824 B2 * | 12/2019 | Zhen | H04L 43/045 |
| 11,165,519 B2 | 11/2021 | Dion et al. | |
| 2009/0278849 A1 * | 11/2009 | Williams | H04W 16/22 345/441 |
| 2010/0124886 A1 * | 5/2010 | Fordham | H04B 17/382 455/67.11 |
| 2016/0127926 A1 * | 5/2016 | Xie | H04W 16/22 455/67.7 |
| 2016/0249241 A1 * | 8/2016 | Barmettler | H04W 24/08 |

(Continued)

*Primary Examiner* — Nam T Tran
(74) *Attorney, Agent, or Firm* — CHRISTENSEN O'CONNOR JOHNSON KINDNESS PLLC

(57) ABSTRACT

A configuration system includes a network data analysis circuit configured to receive and process network usage data from a plurality of access points of the data network to obtain processed network usage data. The network usage data include information about communication channels used by the respective access points. The processed network usage data include information about conflicts between the access points regarding the communication channels. An evaluation circuit is configured to generate a chord diagram based on the processed network usage data. The chord diagram includes a plurality of segments, each assigned to at least one of the communication channels or no communication channel, and the access points being each assigned to at least one of the segments. The chord diagram comprises chords interconnecting the segments having access points assigned thereto, between which there is an actual conflict and/or a potential conflict.

16 Claims, 6 Drawing Sheets

(56) References Cited

U.S. PATENT DOCUMENTS

2018/0083848 A1* 3/2018 Siddiqi ................. H04L 43/045
2021/0111815 A1* 4/2021 Dion ................... H04L 41/0893
2021/0185564 A1* 6/2021 Poolsappasit ......... H04W 16/18

* cited by examiner

CONFIGURATION SYSTEM FOR A DATA NETWORK, DATA NETWORK, AND CONFIGURATION METHOD

FIELD OF THE DISCLOSURE

Embodiments of the present disclosure generally relate to a configuration system for a data network. Embodiments of the present disclosure further relate to a data network and to a configuration method for configuring a data network.

BACKGROUND

Data networks are becoming increasingly important in many fields. The fields of application range from home networks for private use to data networks in public institutions and to data networks having several tens or several hundreds of access points at larger company locations or exhibition halls.

It should be noted that the term "data net" or "data web" is also commonly used for the term "data network".

An optimum configuration of the data network, for example of the access points, becomes increasingly complex as the number of access points increases and usually requires specially trained personnel.

Thus, there is a need for a configuration system for a data network and a data network which facilitate the configuration of the data network.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide a configuration system for a data network. In an embodiment, the configuration system comprises a network data analysis circuit and an evaluation circuit. The network data analysis circuit is set up to receive and process network usage data from a plurality of access points of the data network to obtain processed network usage data. The network usage data comprises information about communication channels used by the respective access points. The processed network usage data comprises information about conflicts between the access points regarding the communication channels. The evaluation circuit is set up to generate a chord diagram based on the processed network usage data. The chord diagram comprises a plurality of segments, the segments being each assigned to at least one of the communication channels or no communication channel, and the access points being each assigned to at least one of the segments. The chord diagram comprises chords, the chords interconnecting the segments having access points assigned thereto, between which there is an actual conflict and/or a potential conflict.

For example, the data network may be a wireless network, for example a WLAN network. Accordingly, the user terminal access points provide wireless connectivity to a local area network (LAN), to a wide area network (WAN), and/or to the Internet. In some embodiments, the access points are WLAN access points, WLAN routers, WLAN repeaters, etc.

The configuration system according to embodiments of the present disclosure is based on the basic idea of providing a chord diagram which comprises information about actual conflicts and/or potential conflicts existing in the data network.

An actual conflict is here and hereinafter understood to mean that at least two of the access points use an at least partially overlapping transmission band, the at least two access points having for example an at least partially overlapping transmission range and/or being adapted to receive signals from each other.

Here and hereinafter, a potential conflict is understood to mean that the respective access points have an at least partially overlapping transmission range and/or can receive signals from each other, the respective access points however using different transmission bands, i.e., different communication channels. Accordingly, should one of the relevant access points change the transmission band or communication channel, the potential conflict may become an actual conflict.

In the following, the term "conflict" is to be understood as an actual conflict and/or a potential conflict.

In the chord diagram, those segments are interconnected by chords which have access points assigned thereto between which there is a conflict. In some embodiments, each segment may have multiple subsegments, each subsegment corresponding to one of the access points that use the corresponding channel. In the chord diagram, the chords interconnect the subsegments having access points assigned thereto between which there is a conflict.

Accordingly, conflicts in the data network are immediately visible to a user of the configuration system according to the present disclosure in the chord diagram. This can significantly reduce the time required to eliminate the conflicts.

Furthermore, reconfiguration of the data network requires much less expertise as the conflicts between access points are automatically evaluated and provided in the chord diagram. In other words, the configuration system according to the present disclosure is thus easier to use.

It is also conceivable that at least one of the access points is (temporarily) deactivated and accordingly (temporarily) does not use a communication channel. Therefore, at least one segment may be provided which is not assigned to any communication channel and which comprises the least one (temporarily) deactivated access point.

In some embodiments, the segments can, for example, be arranged in a ring or ellipse shape.

In some embodiments, the segments each extend over a predefined angle.

If the respective segment is assigned to a communication channel, the predefined angle depends on the number of access points using the respective communication channel.

If the respective segment is not assigned to any communication channel, the predefined angle depends on the number of (temporarily) deactivated access points.

Alternatively, the segments can be arranged in any other suitable form. For example, the segments may be arranged along the edges of a triangle, a quadrilateral, etc.

In some embodiments, a respective placeholder segment may be present between adjacent segments so that boundaries between the individual segments can be more easily identified.

In some embodiments, the segments or subsegments may each include an identifier of the respective associated access points. The identifier is, for example, the SSID of the respective access point or a name of the access point allocated by a user.

In some embodiments, the network usage data may comprise the identifiers of the access points. In other words, the identifiers are thus provided by the access points.

In some embodiments, the chords extend within an area surrounded by the segments.

In some embodiments, the network usage data may also comprise information about frequency bandwidths used by the respective access points and/or about transmission powers of the respective access points.

According to one aspect of the present disclosure, the configuration system comprises, for example, a registration circuit, the registration circuit being set up to add access points to the data network and/or to remove access points from the data network. An operator of the data network may thus add access points to the data network and/or remove access points from the data network by the registration circuit.

For example, the access points are set up to register with the data network via the registration circuit. The registration may be automatic. Alternatively or additionally, the registration may be confirmed by a user.

According to one example configuration of the present disclosure, the network data analysis circuit is set up to receive and process network usage data from the access points about non-network access points, the processed network usage data including information about conflicts between intra-network access points and non-network access points regarding communication channels. Accordingly, the chord diagram includes information about (actual and/or potential) conflicts between the intra-network access points and information about (actual and/or potential) conflicts between the intra-network access points and the non-network access points.

Accordingly, conflicts of the data network access points with non-network access points are immediately visible to a user of the configuration system according to the disclosure in the chord diagram. This can significantly reduce the time and expertise required to eliminate the conflicts.

In some embodiments, the non-network access points are, for example, access points of a further data network, for example a data network of another operator.

A further aspect of the present disclosure provides, for example, that non-network access points are provided in the chord diagram with a different characteristic than intra-network access points. As a result, it is immediately apparent to a user from the chord diagram which access points in the chord diagram belong to the data network and which access points are non-network access points.

In some embodiments, the characteristic may be a color, for example. In some embodiments, the respective identifier of the non-network access points is colored differently than the respective identifier of the intra-network access points.

According to a further example configuration of the present disclosure, the processed network usage data includes information about signal strengths between the access points, a respective strength of the chords being for example correlated with the signal strength between the corresponding access points. Thus, the respective strength of the chords may be a measure of how severe the respective conflicts are. It is therefore immediately apparent to a user from the chord diagram which conflicts are particularly severe and should therefore be prioritized when reconfiguring the data network.

In some embodiments, the respective strength of the chords is proportional to the signal strength between the corresponding access points.

A further aspect of the present disclosure provides, for example, that the configuration system comprises a control circuit, the control circuit being set up to reconfigure the access points based on the processed network usage data such that conflicts between the access points are reduced and/or a data throughput of the access points is increased. In other words, the access points may be automatically reconfigured such that the data network is automatically optimized, for example optimized with respect to a data throughput.

Here and in the following, "reduce the conflicts" is to be understood as reducing the number of conflicts and/or a strength of the conflicts.

In some embodiments, it may also be provided that during reconfiguration, only conflicts having a predefined minimum strength are eliminated. In other words, the conflicts are only eliminated if a certain minimum signal strength prevails between the access points concerned.

In some embodiments, it may be provided that only actual conflicts are eliminated during reconfiguration.

In some embodiments, the control circuit is set up to adjust the communication channels used by the respective access points.

For example, the control circuit comprises a machine learning circuit, the machine learning circuit comprising a machine learning model trained to reconfigure the access points based on the processed network usage data.

In some embodiments, the control circuit is set up to generate adjusted network usage data with respect to the reconfigured access points, the evaluation circuit being set up to generate an adjusted chord diagram based on the adjusted network usage data. Accordingly, the adjusted chord diagram includes information about remaining conflicts in the data network, i.e., conflicts in the data network after reconfiguration of the access points.

In some embodiments, it may be provided that the control circuit is set up to generate preliminary adjusted network usage data regarding the reconfigured access points, the evaluation circuit being set up to generate an adjusted chord diagram based on the preliminary adjusted network usage data. Here, "preliminary" is to be understood as meaning that the access points are not yet actually reconfigured. The adjusted chord diagram may then be a prediction of the remaining conflicts. A user of the configuration system may decide, based on the adjusted chord diagram, whether to reconfigure the access points according to the preliminary adjusted network usage data.

According to one aspect of the present disclosure, the control circuit, for example, is set up to reconfigure the communication channels, frequency bandwidths, and/or transmission powers used by the access points. More specifically, the control circuit is set up to reconfigure the communication channels, frequency bandwidths, and/or transmission powers used by the access points such that conflicts between the access points are reduced and/or a data throughput of the access points is increased.

In some embodiments, the configuration system may be integrated within an access point of the data network or a computing device different from the access points.

In some embodiments, the computing device may be, for example, a server, a personal computer, a laptop, a tablet, a smartphone, or any other suitable smart device.

In some embodiments, a user may access the configuration system, for example, via a browser or via a software application installed on the computing device.

In some embodiments, the configuration system is adapted to be connected to the access points via LAN and/or via a virtual private network. For example, the access points are or will be connected to the configuration system via Ethernet cables. However, it is also conceivable that the access points are or will be connected to the configuration system via another suitable data connection, for example via Powerline or via a coaxial cable ("ethernet-over-coax").

Embodiments of the present disclosure further provide a data network having a plurality of access points, the data network comprising a configuration system as described above.

With regard to the further advantages and properties of the data network, reference is made to the above explanations regarding the configuration system, which also apply to the data network and vice versa.

Embodiments of the present disclosure further provide a configuration method for configuring a data network. In an embodiment, the configuration method comprises the following steps:

Receiving network usage data from a plurality of access points of the data network by a network data analysis circuit, the network usage data including information about communication channels used by the respective access points;

Processing the network usage data by a network data analysis circuit, processed network usage data being thus obtained, the processed network usage data including information about conflicts between the access points regarding the communication channels; and Generating a chord diagram by an evaluation circuit based on the processed network usage data, the chord diagram comprising a plurality of segments, the segments being each assigned to at least one of the communication channels or no communication channel, the access points being each assigned to at least one of the segments, the chord diagram comprising chords, and the chords interconnecting the segments having access points assigned thereto, between which there is an actual conflict and/or a potential conflict In some embodiments, the configuration system and/or data network described above is set up to perform the configuration method.

With regard to the advantages and further properties of the configuration method, reference is made to the above explanations regarding the configuration system and the data network, which also apply to the configuration method, and vice versa.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
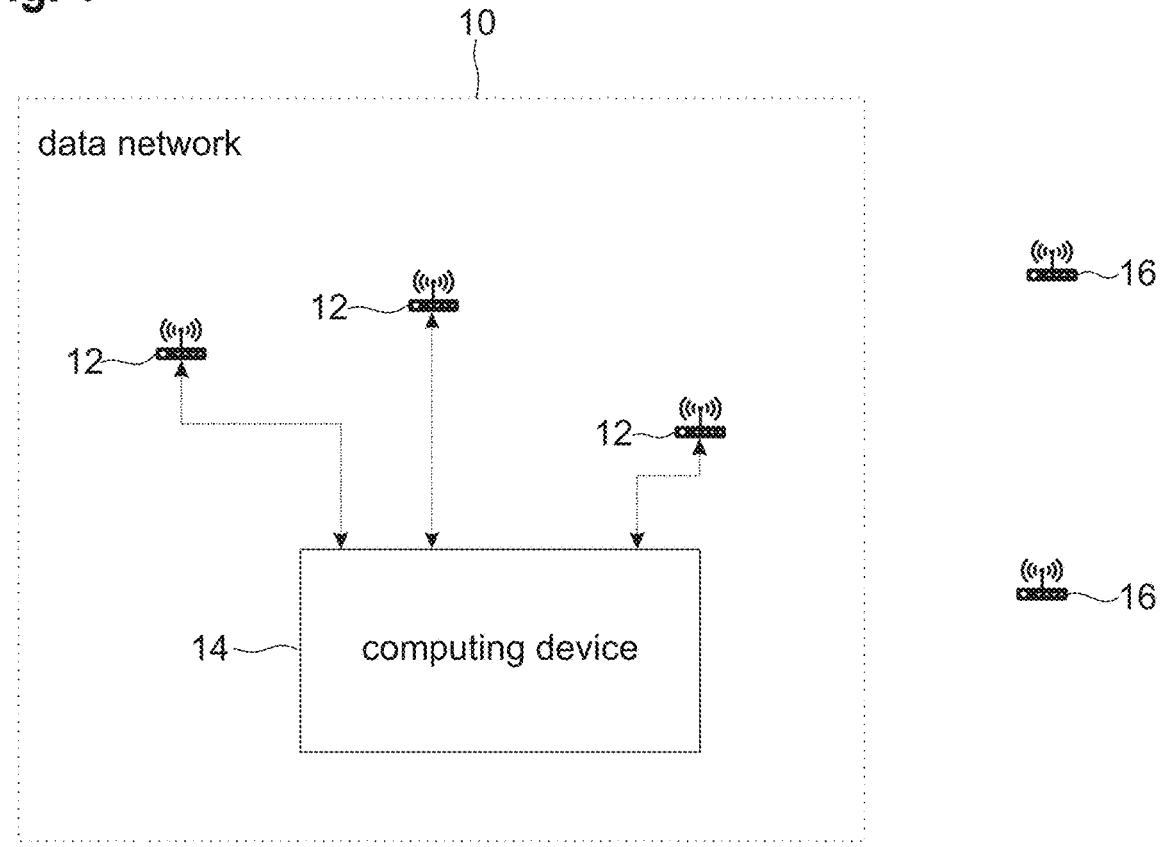
FIG. 1 shows a data network according to an embodiment of the present disclosure.

FIG. 1 schematically shows an example of a data network 10 having a plurality of access points 12 and a computing device 14. In some embodiments, the data network 10 is designed as a wireless network, for example as a WLAN network. Accordingly, the access points 12 provide a wireless connection to a local area network (LAN), to a wide area network (WAN), and/or to the Internet. In some embodiments, the access points 12 are WLAN access points, WLAN routers, WLAN repeaters, etc. For example, the data network 10 may have tens or hundreds of access points 12.

In some embodiments, the computing device 14 is configured, for example, as a server, as multiple servers, as a cloud instance, as a WLAN controller, as a master access point of the data network 10, as a personal computer, as a laptop, as a tablet, or as a smartphone. The access points 12 are connected to the computing device 14 via LAN and/or via a virtual private network. For example, the access points 12 may be connected to the computing device 14 via Ethernet cables. However, it is also conceivable that the access points 12 are connected to the computing device 14 via another suitable data connection, for example via powerline or via a coaxial cable ("ethernet-over-coax").

FIG. 1 also shows that further, non-network access points 16 may be provided. The non-network access points 16 are, for example, access points of a further data network, for example a data network of another operator.

Figure 2:
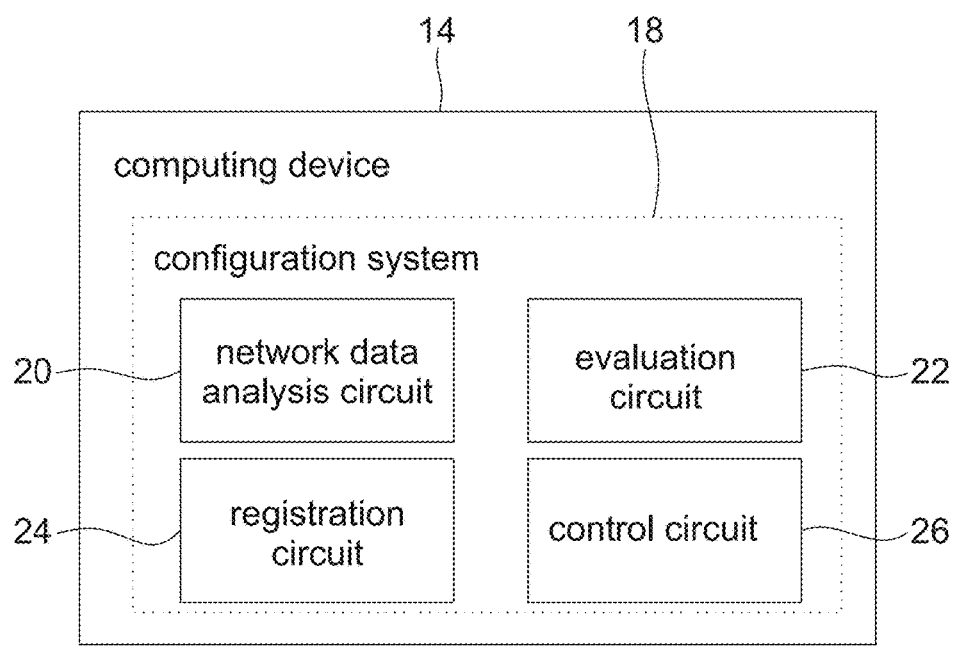
FIG. 2 shows a configuration system according to an embodiment of the present disclosure.

FIG. 2 schematically shows an example embodiment of the computing device 14. As shown in FIG. 2, the computing device 14 comprises a configuration system 18 having a network data analysis circuit 20, an evaluation circuit 22, a registration circuit 24 and a control circuit 26. It should be noted that the configuration system 18 could also be integrated into one or more of the access points 12.

In general, the network data analysis circuit 20 is set up to receive and process network usage data from the access points 12. The evaluation circuit 22 is set up to evaluate network usage data processed by the network data analysis circuit 20. The registration circuit 24 is set up to add access points to the data network 10 and/or to remove access points from the data network 10. For example, the access points 12 are set up to register with the data network 10 via the registration circuit 24. The control circuit 26 is set up to reconfigure the access points 12 of the data network 10.

The registration of access points 12 may be automatic. Alternatively or additionally, the registration of access points 12 may be performed and/or confirmed by a user, for example via a suitable user interface of the configuration system 18.

Figure 3:
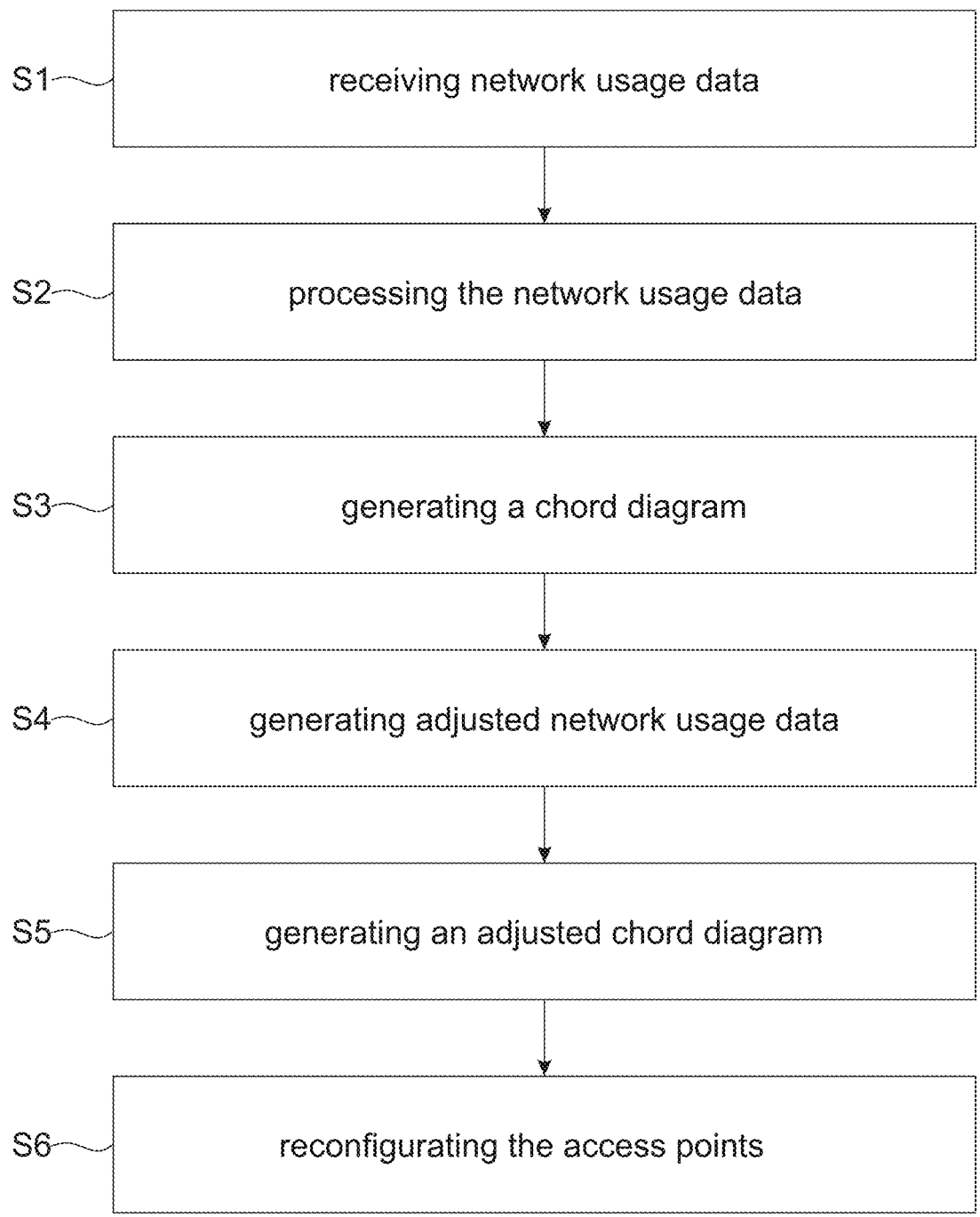
FIG. 3 schematically shows an example flow chart of a configuration method for configuring the data network of FIG. 1.

The data network 10 or configuration system 18 is set up to perform a configuration method, an example of which is described below with reference to FIG. 3 for configuring the data network 10.

Network usage data is received by the network data analysis circuit 20 from the access points 12 of the data network 10, for example from all access points 12 of the data network 10 (step S1).

The network usage data includes information about communication channels used by the respective access points 12, as well as communication channels used by the respective non-network access points 16.

The network usage data may also include information about frequency bandwidths used by the respective access points 12 and/or about transmission powers of the respective access points 12, for example information about signal strengths between the access points 12.

Furthermore, the network usage data may also contain information about frequency bandwidths used by the respective non-network access points 16 and/or about transmission powers of the respective non-network access points 16, for example information about signal strengths between the access points 12 and the non-network access points 16.

Furthermore, the network usage data may include identifiers of the access points 12 and/or identifiers of the non-network access points 16, as will be further explained below.

The network usage data is processed by the network data analysis circuit 20, thereby obtaining processed network usage data (step S2).

The processed network usage data includes information about actual conflicts and/or potential conflicts between the access points 12 regarding the communication channels, and information about actual conflicts and/or potential conflicts between the access points 12 and the non-network access points 16 regarding the communication channels.

In some embodiments, the processed network usage data includes information about actual conflicts and/or potential conflicts between the access points 12 regarding the frequency bandwidths used, and/or information about actual conflicts and/or potential conflicts between the access points 12 and the non-network access points 16 regarding the frequency bandwidths used.

Hereinafter, an actual conflict is understood to mean that at least two of the access points 12, 16 having an at least partially overlapping transmission area use an at least partially overlapping transmission band, the at least two access points 12, 16 being for example within range of each other.

Here and hereinafter, a potential conflict is understood to mean that at least two of the access points 12, 16 have an at least partially overlapping transmission range and/or can receive signals from each other, but that the at least two access points 12, 16 use different transmission bands, i.e. different communication channels. Accordingly, should one of the at least two access points 12, 16 change transmission band or communication channel, the potential conflict may become an actual conflict.

Hereinafter, the term "conflict" is understood to mean an actual conflict and/or a potential conflict.

Based on the processed network usage data, a chord diagram 28 is generated by the evaluation circuit 22 (step S3).

Figure 4:
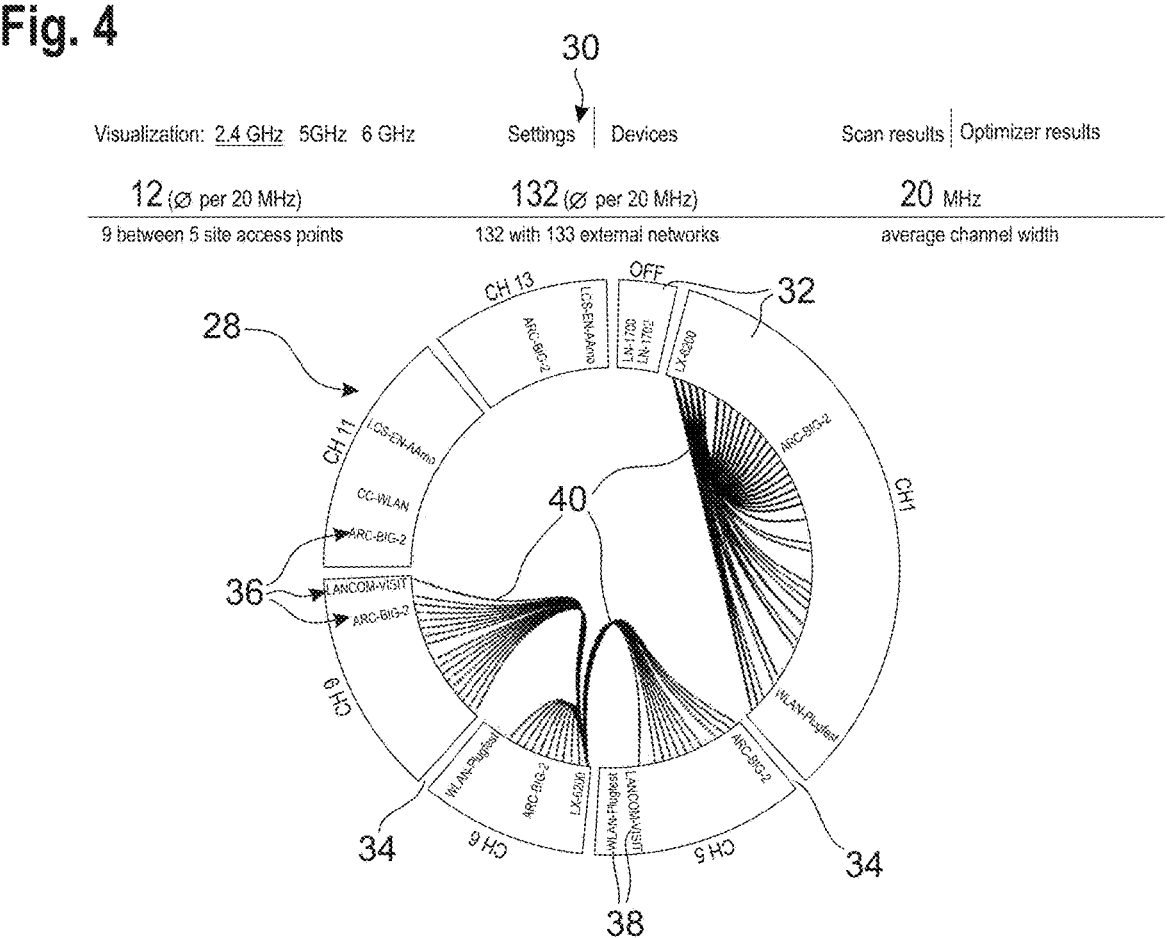
FIG. 4 schematically shows an example of a chord diagram before optimization of the configuration of the data network of FIG. 1.

The example of a chord diagram 28 is illustrated in FIG. 4, which schematically shows a user interface 30 of the configuration system 18. A user may access the user interface 30 via a browser or via a software application installed on the computing device 14, for example.

In the example shown, the chord diagram 28 comprises a plurality of segments 32, each segment 32 being assigned to at least one of the communication channels or no communication channel. The communication channels are designated "CH 1", "CH 5", etc. in FIG. 4. A segment 32 which is not assigned to any communication channel is designated "OFF" in FIG. 4. In some embodiments, the segments 32 are arranged in a ring, with a placeholder segment 34 being respectively provided between adjacent segments 32.

The access points 12, 16 are each assigned to at least one of the segments 32. In some embodiments, the access points 12, 16 are assigned to the at least one segment 32 the assigned communication channel or main communication channel of which is used by the respective access point 12, 16.

It is also conceivable that at least one of the access points 12, 16 is (temporarily) deactivated and accordingly (temporarily) does not use any communication channel. These access points 12, 16 are assigned to the segment 32 which is not assigned to any communication channel.

In some embodiments, the segments 32 each extend over a predefined angle. If the respective segment 32 is assigned to a communication channel, the predefined angle depends on the number of access points 12, 16 that use the respective communication channel. If the respective segment 32 is not assigned to any communication channel, the predefined angle depends on the number of (temporarily) deactivated access points.

In some embodiments, the segments 32 each comprise at least one subsegment 36, for example a plurality of subsegments 36, the subsegments 36 being each assigned to exactly one of the access points 12, 16. The subsegments 36 each comprise an identifier 38 of the assigned access point 12, 16. The identifier 38 is, for example, the SSID of the respective access point or a name of the access point 12, 16 which has been allocated by a user.

The non-network access points 16 may be provided in the chord diagram 28 with a different characteristic than intra-network access points 12. For example, the respective identifier 38 of the access points 12 of the data network 10 has a different color than the respective identifier 38 of the non-network access points 16.

Alternatively or additionally, the segments 32 having at least one non-network access point 16 assigned thereto may have a different color than the segments 32 having no non-network access point 16 assigned thereto.

In some embodiments, the chord diagram 28 further comprises chords 40, the chords 40 interconnecting the segments 32 or, more specifically, the subsegments 36 having access points 12, 16 assigned thereto, between which there is a conflict. The chords 40 extend within an area surrounded by the annularly arranged segments 32.

In some embodiments, a respective strength of the chords 40 may be correlated with the signal strength between the corresponding access points 12, 16, for example in a directly proportional manner.

By the control circuit 26, adjusted network usage data is generated for the access points 12 (step S4).

Generally speaking, the adjusted network usage data corresponds to an adjusted configuration of the access points 12, i.e. an adjusted configuration of the respective communication channels, frequency bandwidths, and/or transmission powers used by the access points 12.

The adjusted configuration is such that conflicts in the data network 10 are reduced and/or a data throughput of the access points 12 is increased. In other words, the number of conflicts is reduced, the strength of the conflicts is reduced, and/or the data throughput of the access points 12 is increased.

The adjusted network usage data may be preliminary adjusted network usage data, i.e. that the access points 12 have not yet been actually reconfigured.

For example, the control circuit 26 comprises, in some embodiments, a machine learning circuit. The machine learning circuit comprises a machine learning model trained to reconfigure the access points 12 based on the processed network usage data or to generate the (preliminary) adjusted network usage data based on the processed network usage data.

By the evaluation circuit 22, an adjusted chord diagram 42 is generated based on the adjusted network usage data (step S5).

Figure 5:
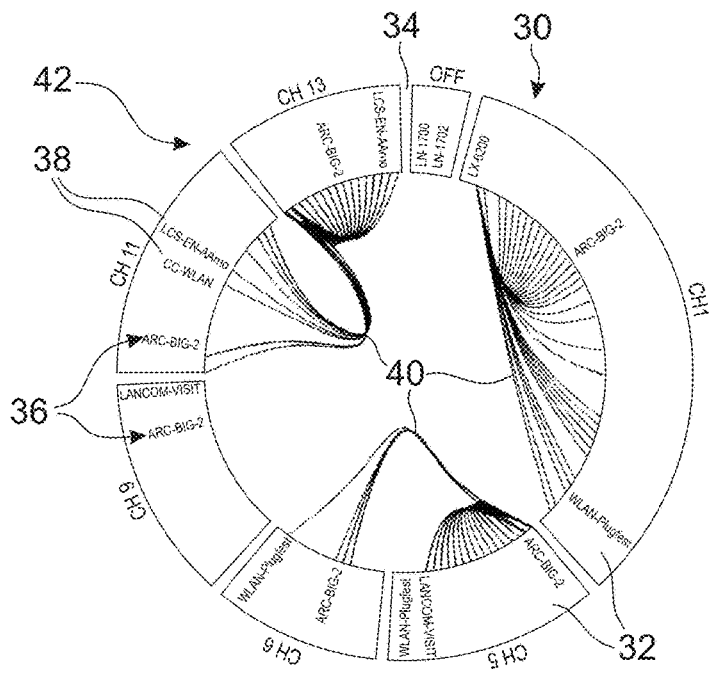
FIG. 5 schematically shows an example of a chord diagram after optimization of the configuration of the data network of FIG. 1.

FIG. 5 shows an exemplary adjusted chord diagram 42. The adjusted chord diagram 42 is formed analogously to the chord diagram 28 described above. Accordingly, reference is made to the above explanations regarding the chord diagram 28.

The adjusted chord diagram 42 includes information about conflicts remaining in the data network 10 when the access points 12 are reconfigured according to the adjusted network usage data. A user or operator of the data network 10 may agree to the (preliminary) adjusted network usage data or make changes to the (preliminary) adjusted network usage data via the user interface 30.

By the control circuit 26, the access points 12 are reconfigured based on the adjusted network usage data (step S6).

In some embodiments, the communication channels, frequency bandwidths and/or transmission powers used by the access points 12 are adjusted such that the conflicts between the access points 12, 16 are reduced and/or the data throughput of the access points 12 is increased. Accordingly, an optimized configuration of the data network 10 with reduced internal and external conflicts and/or with increased data throughput is obtained.

Figure 6:
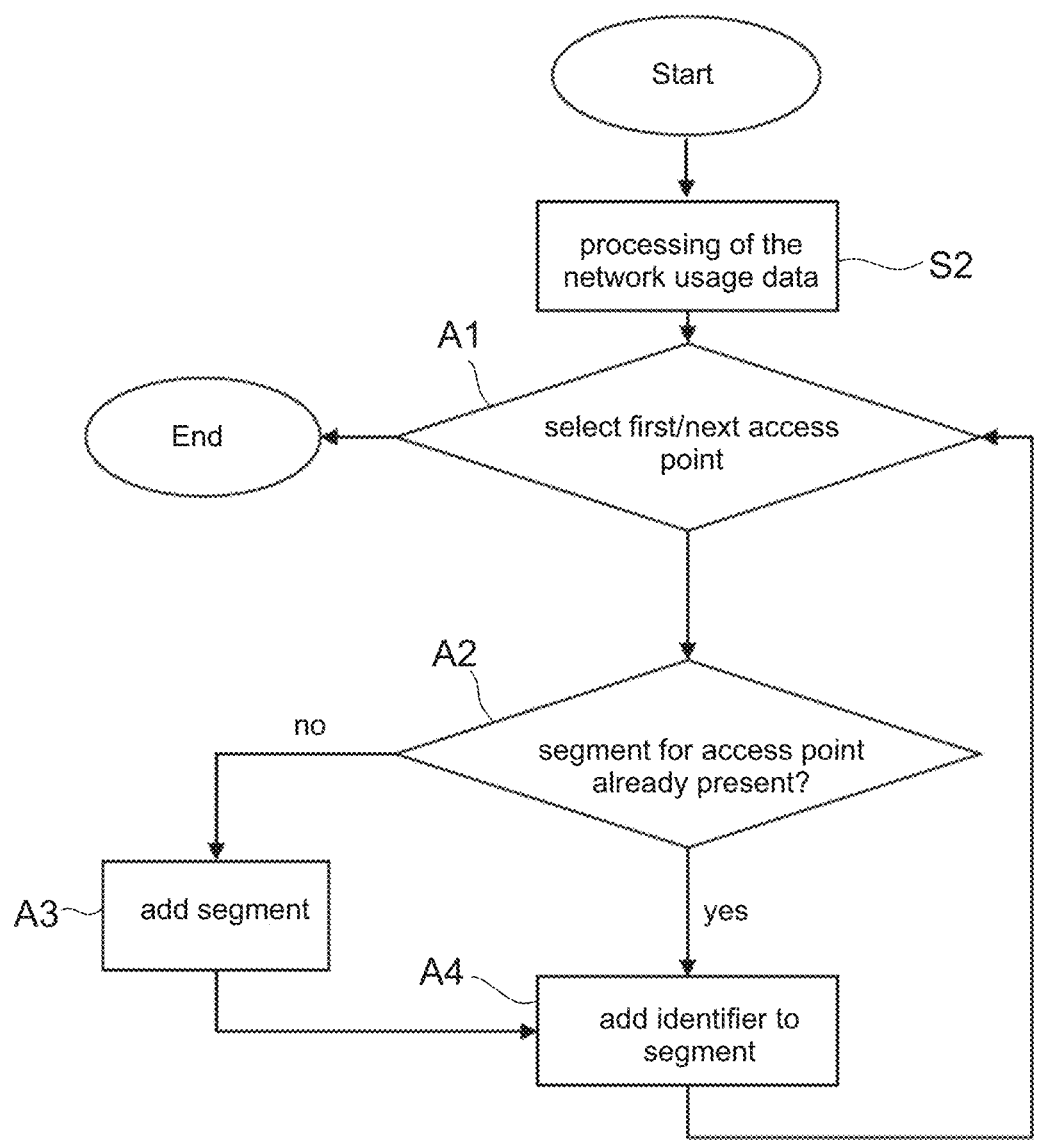
FIG. 6 shows an example flow chart for explaining the configuration method of FIG. 3 in more detail.

FIG. 6 shows an example embodiment of a flow chart in which a possible configuration of step S3 described above is explained in more detail.

As long as not all access points 12 have been considered, the first or the next access point 12 is selected (step A1). It is checked whether there is already a segment 32 to which the selected access point 12 is assigned (step A2). If no such segment 32 exists, a new segment 32 is added (step A3). The identifier 38 of the selected access point 12 is added to the matching segment 32 as a subsegment 36 (step A4). Steps A1 to A4 described above are repeated until all access points 12 have been considered.

Figure 7:
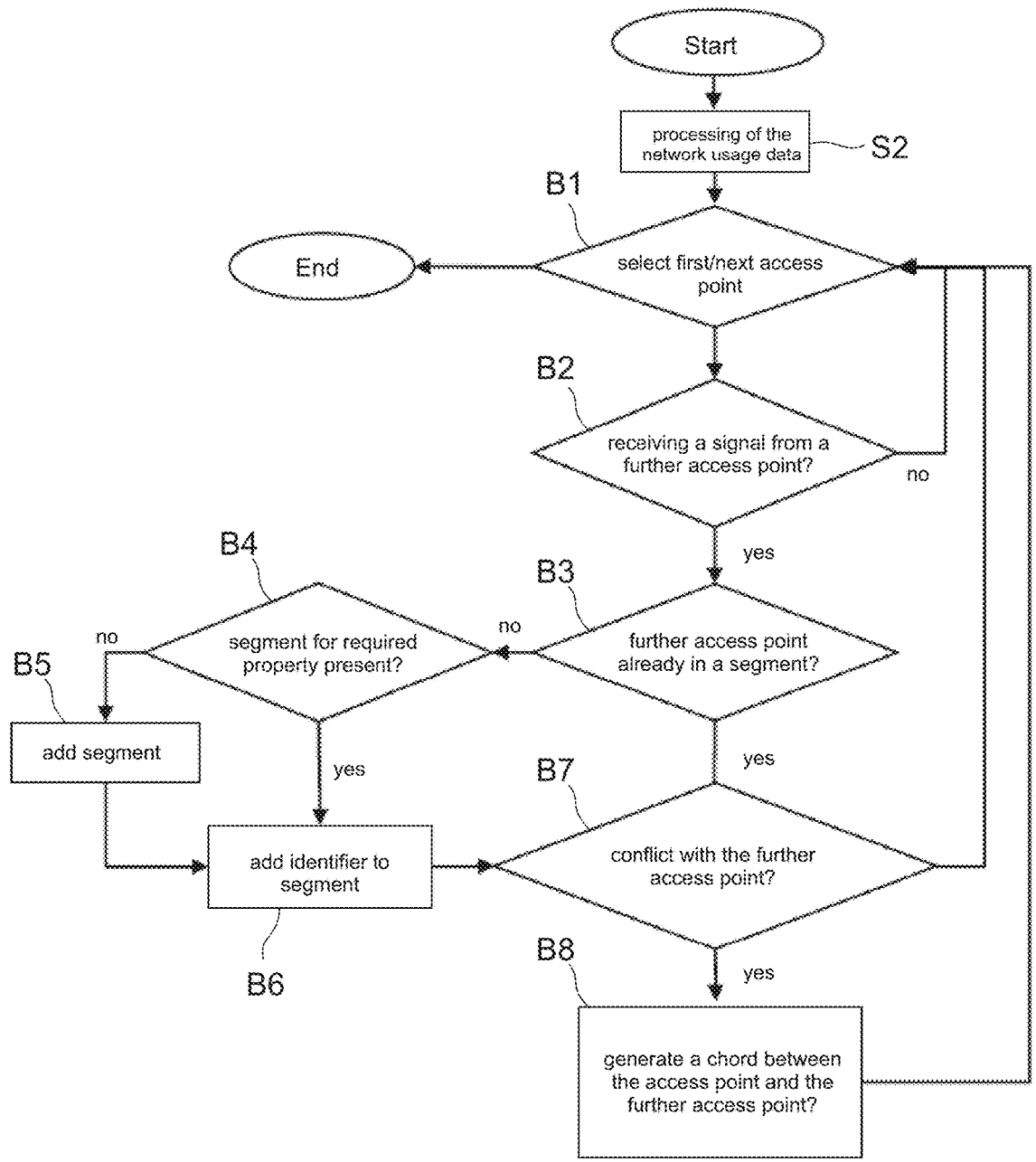
FIG. 7 shows a further example flow chart for explaining the configuration method of FIG. 3 in more detail.

FIG. 7 shows an example flow chart in which a further possible configuration of step S3 described above is explained in more detail.

As long as not all access points 12 have been considered, the first or the next access point 12 is selected (step B1). Now it is checked whether the selected access point 12 receives a signal from a further intra-network or non-network access point 12, 16 (step B2). If this is not the case, step B1 is repeated.

If the selected access point 12 receives a signal from a further intra-network or non-network access point 12, 16, it is checked whether there is already a segment 32 to which the further access point 12, 16 is assigned (step B3). If no such segment 32 is present, it is checked whether a segment 32 already exists for the requested property, i.e., a segment 32 for the communication channel used by the further access point 12, 16 (step B4). If no such segment 32 exists, a new segment 32 is added (step B5).

The identifier 38 of the further access point 12, 16 is added to the matching segment 32 as a subsegment 36 (step B6). It is checked whether there is a conflict between the selected access point 12 and the further access point 12, 16 (step B7). If this is not the case, step B1 is repeated. If there is a conflict, a chord 40 is generated between the subsegments 36 assigned to the selected access point 12 and the further access point 12, 16 (step B8).

In some embodiments, a strength of the chord 40 may be correlated with the signal strength between the selected access point 12 and the further access point 12, 16, for example in a directly proportional manner.

The steps B3 to B8 described above may be performed for each further access point 12, 16 from which the selected access point 12 receives a signal. The steps B1 to B8 described above are repeated until all access points 12 have been considered.

For example, steps A1 to A4 may be performed first until all access points 12 have been considered. Steps B1 to B8 can then be performed until all access points 12 have been considered.

Figure 8:
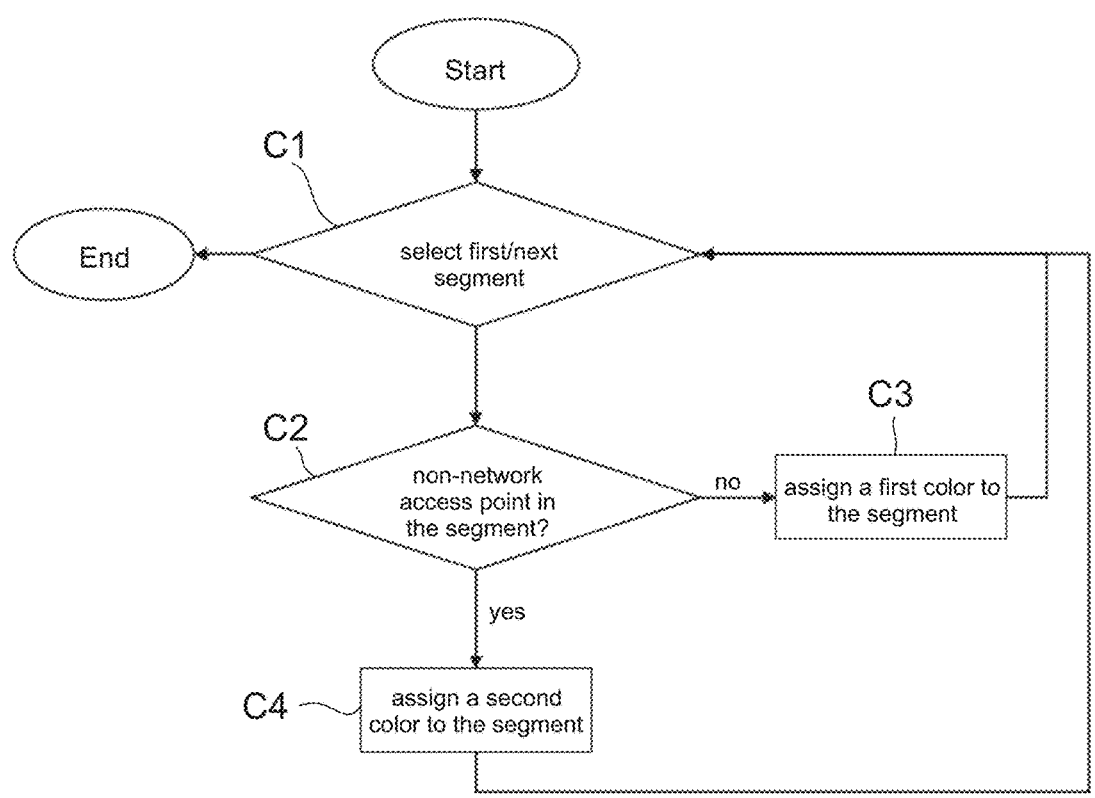
FIG. 8 shows a yet another example flow chart for explaining the configuration method of FIG. 3 in more detail.

FIG. 8 shows an example flow chart in which a further possible configuration of step S3 described above is explained in more detail.

As long as not all segments 32 have been considered, the first or the next segment 32 is selected (step C1). Now it is checked whether the selected segment 32 contains a non-network access point 16 (step C2).

If the selected segment 32 does not contain any non-network access point 16, a first characteristic, for example a first color, is assigned to the selected segment 32 (step C3). If a non-network access point 16 is contained in the selected segment 32, a second characteristic, for example a second color, is assigned to the selected segment 32 (step C4).

The steps C1 to C4 described above are repeated until all segments 32 have been considered.

For example, steps A1 to A4 can be performed first until all access points 12 have been considered. Subsequently, steps B1 to B8 may be performed until all access points 12 have been considered. Subsequently, steps C1 to C4 may be performed until all segments 32 have been considered.

Certain embodiments disclosed herein include components, for example the computing device 14, the configuration system 18, etc., that utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a graphical processing unit (GPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In some embodiments, the configuration system 18, or circuits thereof, is programmed to carry out one or more steps of any of the methods disclosed herein. In some embodiments, one or more computer-readable media associated with or accessible by the configuration system 18, or circuits thereof, contains computer readable instructions embodied thereon that, when executed by the configuration system 18, or circuits thereof, cause the configuration system 18, or circuits thereof, to perform one or more steps of any of the methods disclosed herein.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about." "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this document, the same or similar elements may bear the same references. Furthermore, the presence of reference numbers or letters in the drawings cannot be considered limiting, even when such numbers or letters are indicated in the claims.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A configuration system for a data network, the configuration system comprising:
   a network data analysis circuit configured to receive and process network usage data from a plurality of access points of the data network to obtain processed network usage data, the network usage data including information about communication channels used by the respective access points, and the processed network usage data including information about conflicts between the access points regarding the communication channels;
   an evaluation circuit configured to generate a chord diagram based on the processed network usage data, wherein the chord diagram comprises a plurality of segments, the segments being each assigned to at least one of the communication channels or no communication channel, and the access points being each assigned to at least one of the segments, and wherein the chord diagram comprises chords, the chords interconnecting the segments having access points assigned thereto, between which there is an actual conflict and/or a potential conflict,
   wherein the network data analysis circuit is configured to receive and process network usage data from the access points about non-network access points, the processed network usage data including information about conflicts between intra-network access points and non-network access points regarding the communication channels, and
   wherein the non-network access points are provided in the chord diagram, the non-network access points being provided in the chord diagram with a different characteristic than intra-network access points.

2. The configuration system according to claim 1, further comprising a registration circuit, the registration circuit being configured to add access points to the data network and/or to remove access points from the data network.

3. The configuration system according to claim 1, wherein the processed network usage data includes information about signal strengths between the access points.

4. The configuration system according to claim 3, wherein a respective strength of the chords is correlated with the signal strength between the corresponding access points.

5. The configuration system according to claim 1, further comprising a control circuit, the control circuit configured to reconfigure the access points based on the processed network usage data so that conflicts between the access points are reduced and/or a data throughput of the access points is increased.

6. The configuration system according to claim 5, wherein the control circuit is configured to generate adjusted network usage data regarding the reconfigured access points, and the evaluation circuit being set up to generate an adjusted chord diagram based on the adjusted network usage data.

7. The configuration system according to claim 5, wherein the control circuit is configured to reconfigure the communication channels, frequency bandwidths and/or transmitting powers used by the access points.

8. The configuration system according to claim 1, wherein the configuration system is integrated within an access point of the data network or a computing device different from the access points.

9. The configuration system according to claim 1, wherein the configuration system is adapted to be connected to the access points via LAN and/or a virtual private network.

10. A computer system having a plurality of access points, the computer system comprising a configuration system according to claim 1.

11. A configuration method for configuring a data network, the configuration method comprising the following steps:
   receiving network usage data from a plurality of access points of the data network by a network data analysis circuit, the network usage data including information about communication channels used by the respective access points;
   processing the network usage data by the network data analysis circuit, processed network usage data being thus obtained, the processed network usage data including information about conflicts between the access points regarding the communication channels; and
   generating a chord diagram by an evaluation circuit based on the processed network usage data, the chord diagram comprising a plurality of segments, the segments being each assigned to at least one of the communication channels or no communication channel, the access points being each assigned to at least one of the segments, the chord diagram comprising chords, and the chords interconnecting the segments having access points assigned thereto, between which there is an actual conflict and/or a potential conflict,
   wherein the processed network usage data includes information about signal strengths between the access points, and
   wherein a respective strength of the chords is proportional to the signal strength between the corresponding access points, such that the respective strength of the chords is a measure of the severity of the respective conflict.

12. The configuration method according to claim 11, wherein network usage data about non-network access points is received and processed from the access points, the processed network usage data including information about conflicts between intra-network access points and non-network access points regarding the communication channels.

13. The configuration method according to claim 12, wherein non-network access points are provided in the chord diagram with a different characteristic than intra-network access points.

14. The configuration method according to claim 11, wherein the access points are reconfigured by a control circuit based on the processed network usage data so that conflicts between the access points are reduced and/or a data throughput of the access points is increased.

15. The configuration method according to claim 14, wherein adjusted network usage data regarding the reconfigured access points is generated by the control circuit, and an adjusted chord diagram being generated by the evaluation circuit based on the adjusted network usage data.

16. The configuration method according to claim 14, wherein the communication channels, frequency bandwidths and/or transmitting powers used by the access points being reconfigured by the control circuit.

* * * * *